(12) United States Patent
Perrin et al.

(10) Patent No.: US 9,186,820 B2
(45) Date of Patent: Nov. 17, 2015

(54) MOLDING ELEMENT COMPRISING CUTTING MEANS FOR MOLDING AND VULCANIZING A TIRE TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Frédéric Perrin, Clermont-Ferrand (FR); Shuichi Kaneko, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/367,105

(22) PCT Filed: Dec. 20, 2012

(86) PCT No.: PCT/EP2012/076362
§ 371 (c)(1),
(2) Date: Jun. 19, 2014

(87) PCT Pub. No.: WO2013/092846
PCT Pub. Date: Jun. 27, 2013

(65) Prior Publication Data
US 2015/0037449 A1    Feb. 5, 2015

(30) Foreign Application Priority Data

Dec. 22, 2011  (FR) ..................................... 11 62258

(51) Int. Cl.
*B29D 30/06* (2006.01)
*B29C 33/00* (2006.01)
(Continued)

(52) U.S. Cl.
CPC ............ *B29C 33/00* (2013.01); *B29D 30/0005* (2013.01); *B29D 30/0606* (2013.01);
(Continued)

(58) Field of Classification Search
CPC ................... B29D 30/0606; B29D 2030/0612; B29D 2030/0613; B29C 33/42; B29C 33/424
See application file for complete search history.

(56) References Cited

U.S. PATENT DOCUMENTS 4,619,300 A * 10/1986 Tokunaga et al. .......... 152/209.5
6,044,882 A    4/2000 Crawford et al.
(Continued)

FOREIGN PATENT DOCUMENTS

| EP | 0911187 A1 | 4/1999 |
| GB | 1124915 | 8/1968 |
| WO | 03089257 A1 | 10/2003 |
| WO | 2006069912 A1 | 7/2006 |

OTHER PUBLICATIONS

PCT/EP2012/076362, International Search Report (ISR), Form PCT/ISA/210, dated Feb. 28, 2013 (including English translation), 7 pgs.

*Primary Examiner* — James Mackey
(74) *Attorney, Agent, or Firm* — Dickinson Wright PLLC

(57) ABSTRACT

A molding element) of a mold for molding and vulcanizing a tire treadcontaining a molding surface intended to mold part of the tread surface of the tire and a complex blade of projecting from the molding surface, containing a body oriented mainly in a circumferential direction X and at least one U-shaped secondary branch facing towards this body, the secondary branch being oriented mainly in an oblique direction J, J making a non-zero angle ψ with a transverse direction Y perpendicular to the circumferential direction X, the secondary branch in contact with the main body at two contact zones to delimit a cavity of length L, wherein the molding element has a main cutting means projecting from the molding surface, extending between two of its ends and running parallel to J, the length being less than the length L, and wherein the molding element has at least two secondary cutting means of height Hs extending from one of the ends of the main cutting means as far as one of the contact zones facing this end, and forming an angle θ with this body.

3 Claims, 2 Drawing Sheets

(51) Int. Cl.
  *B29D 30/00* (2006.01)
  *B29C 33/42* (2006.01)
(52) U.S. Cl.
  CPC ......... *B29C33/42* (2013.01); *B29D 2030/0011* (2013.01); *B29D 2030/0612* (2013.01); *B29D 2030/0613* (2013.01)

(56) References Cited

U.S. PATENT DOCUMENTS

| | | | |
|---|---|---|---|
| 7,311,128 B2 * | 12/2007 | Bruant et al. | 152/209.5 |
| 2005/0109436 A1 | 5/2005 | Bruant et al. | |
| 2008/0149260 A1 | 6/2008 | Orsat | |

* cited by examiner

MOLDING ELEMENT COMPRISING CUTTING MEANS FOR MOLDING AND VULCANIZING A TIRE TREAD

This application is a 371 national phase entry of PCT/EP2012/076362, filed 20 Dec. 2012, which claims benefit of FR 1162258, filed 22 Dec. 2011, the entire contents of which are incorporated herein by reference for all purposes.

BACKGROUND

1. Field

The present disclosure relates to the field of molds for molding and vulcanizing a tire tread. More specifically, the disclosure relates to the molds used for molding in the tread blocks which are partially covered by a layer of a covering material.

2. Description of Related Art

It is known practice to design tires the tread of which comprises various rubber compounds. Document WO 03089257 discloses such treads. More specifically, document WO 03089257 discloses a tread comprising tread blocks the walls of which are covered with a layer of covering material. The material of which this cover layer is made differs from the rubber compound of which the tread is made. This material notably has much better wet grip than the wet grip of the rubber compound. This allows a very significant improvement in cornering performance on wet ground.

One way of manufacturing this tread is notably disclosed in document WO 2006069912. According to this method of manufacture, in a first step, provision is made for the material intended to constitute a layer of covering material to be injected in the form of one or more inserts into the green tire using an injection nozzle. The insert or inserts is or are then shaped, in a second step, by ribs of a vulcanizing mold so that they cover all or part of the walls of the grooves molded by these ribs.

This method of manufacture has its limits, particularly as far as obtaining precision moldings is concerned. Specifically, during the shaping thereof, the insert experiences a significant shear force from the rib in order to convert this insert into a layer of lesser thickness. This shear force may cause cracking within the insert, making it more difficult to control the movements of the material of which this insert is made. The shape and the thickness of the layer of covering material thus formed may therefore be somewhat haphazard. The advantages afforded by the additional layer to the performance of the tire are then reduced.

In addition, in this method of manufacture, it is necessary to make the inserts align with the ribs. This makes manufacture of the tread more complicated.

Document FR11/61796 discloses a method of manufacturing a tire which involves cutting a layer of cover material laid beforehand on a green tire and placing part of this cover layer into a cut molded by a blade of a molding element. In that method, the layer of covering material is cut and forced into the depth of the green tire in one and the same movement of the molding element with respect to the green tire.

In order to improve the grip of a winter tire, also known as a snow tire on snow-covered ground it is known practice to use within the tread a rubber material that has a low elastic modulus. The overall rigidity of the tread blocks that make up this tread is therefore reduced, and this may also reduce their resistance to wear.

In order to improve the rigidity of the blocks while at the same time maintaining good grip on snowy ground, it is known practice to form a tread with inclined blocks making an angle greater than 0° with an axial direction of the tire. In this way, each block offers a greater apparent beam section with respect to the loadings applied to this block.

Again with a view to improving the rigidity of the blocks, it is known practice to provide the lateral faces of the blocks with a layer of a covering material that has an elastic modulus higher than the elastic modulus of the rubber material.

However, manufacturing a snow tire comprising such inclined blocks using the method of manufacture of document FR11/61796 presents a certain number of difficulties. In particular, it has been observed that the shape of the cut-outs in the cover layer do not match well with the shape of the lateral walls of the inclined blocks intended to accept this cover layer, and this leads to problems regarding the way in which the tire behaves.

There is therefore a need to improve the incorporation of a layer of a covering material on the walls of inclined tread blocks of a tire tread.

DEFINITIONS

A "tire" means all types of elastic tire whether or not subjected to an internal pressure.

A "snow tire" (also known as a "winter tire") means a tire identified by an inscription M+S or M.S. or even M&S marked on at least one of the side walls of the tire. This snow tire is characterized by a tread pattern and a rubber composition which are intended first and foremost, in mud and fresh or melting snow, to behave better than a road tire that is designed to run on ground that is not covered with snow.

A "green tire" or "green form" of a tire means a superposition of a plurality of semi-finished rubber products present in the form of strips or sheets, with or without reinforcement. The green tire is intended to be vulcanized in a mold in order to obtain the tire.

The "tread" of a tire means a quantity of rubber material bounded by lateral surfaces and by two main surfaces one of which is intended to come into contact with a road surface when the tire is running.

A "tread surface" means the surface formed by those points on the tire tread that come into contact with the road surface when the tire is running.

A "mold" means a collection of separate molding elements which, when brought closer towards one another, delimit a toroidal molding space.

A "molding element" of a mold means part of a mold. A molding element is, for example, a mold segment.

A "molding surface" of a molding element means the surface of the mold that is intended to mold the surface of the tire tread.

A "blade" of a molding element means a protrusion projecting from the molding surface. In the blades category, a distinction is made between sipe blades which are less than 2 mm wide and ribs which have a width of 2 mm or more. Sipe blades are intended to mold sipes in the tire tread, which means cuts which at least partially close up when they fall within the contact patch where the tire makes contact with the ground. The ribs are intended to mold grooves in the tread, which means cuts which do not close up when they fall within the contact patch in which the tire makes contact with the ground. The blades have a rounded end.

A cutting means means a protrusion projecting from the molding surface. This protrusion is able to cut the layer of a covering material covering the green tire.

The "height of the blade or, respectively, of the cutting means" means the distance between the molding surface of the mold and the end of the blade or respectively of the cutting means.

The "elastic modulus" of an elastic material means the ratio between the variation in stress and the variation in strain when this material is subjected to tensile or compressive loadings.

SUMMARY

The invention, in an embodiment, relates to a molding element of a mold for molding and vulcanizing a tread of a tire. This molding element comprises a molding surface intended to mold part of the tread surface of the tire and a complex blade of height H projecting from the molding surface. The complex blade comprises a body oriented mainly in a circumferential direction X and at least one U-shaped secondary branch facing towards this body. The secondary branch is oriented mainly in an oblique direction J, this oblique direction making a non-zero angle $\psi$ with a transverse direction Y perpendicular to the circumferential direction X. The secondary branch is in contact with the body at two contact zones to delimit a cavity of length L. The molding element comprises a main cutting means of height Hp projecting from the molding surface into the cavity. This main cutting means extends between two of its ends running parallel to the oblique direction J, the length of this main cutting means being less than the length L of the cavity. The molding element comprises two secondary cutting means of height Hs extending from one of the ends of the main cutting means as far as a respective one of the contact zones facing this end, each secondary cutting means making an angle $\theta$ with this main body. The height Hp of the main cutting means and the height Hs of the secondary cutting means are greater than the height H of the complex blade.

The secondary cutting means allow the dimensions of the cut parts of the cover layer to be adapted to suit the inclination of the block with respect to the transverse direction Y. Application of the material of which the cover layer is made to the lateral walls of this block is thus improved.

The secondary cutting means also make it possible to cut part of the cover layer in a shape that is triangular overall. This cut part of the cover layer will cover a lateral wall of the block molded by the complex blade. In other words, this lateral wall of the block partially delimits a groove in the tire. By selecting a suitable cover material, it is possible, for example, to promote the flow of water along this groove in order to improve the grip of the tire on wet ground. Transverse grip on snowy ground following wear can also be improved, and it is even possible to improve the transverse rigidity of this block.

In a preferred embodiment, the angle $\theta$ is identical to the angle $\psi$.

In an alternative form of embodiment, the main cutting means is arranged in the cavity in such a way that the secondary cutting means respectively make different angles with the main body of the cutting blade.

BRIEF DESCRIPTION OF THE DRAWINGS

Other features and advantages of embodiments of the invention will emerge from the following description, given by way of nonlimiting example, with reference to the attached drawings in which.

DETAILED DESCRIPTION OF SPECIFIC EMBODIMENTS

In the description that follows, elements that are substantially identical or similar will be denoted by identical references.

Figure 1:
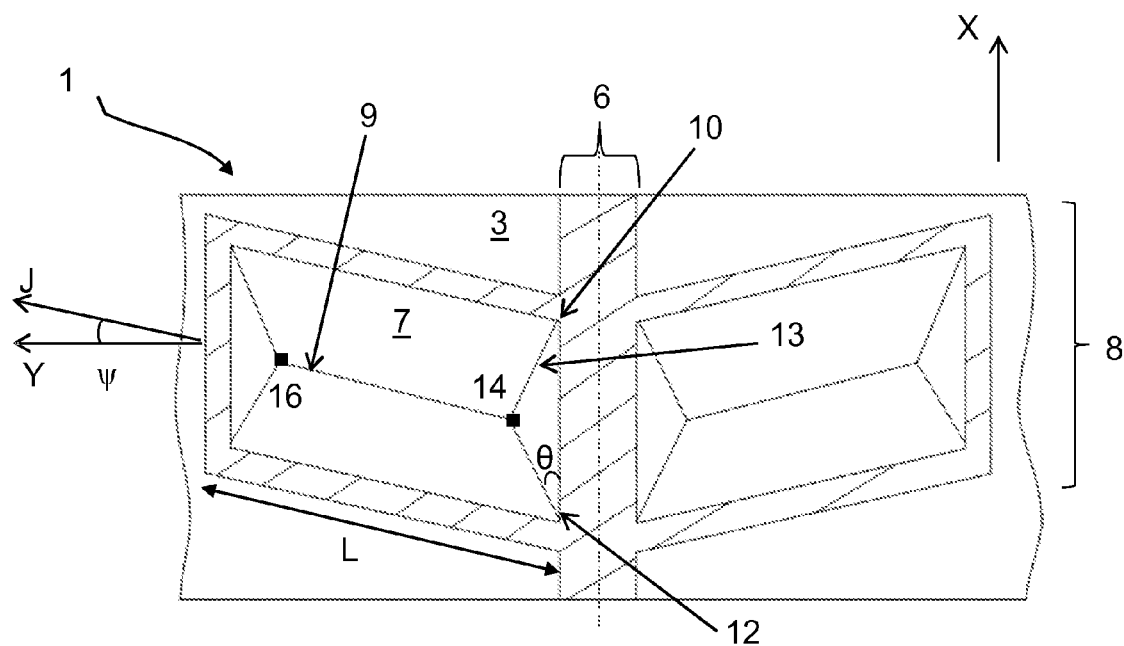
FIG. 1 schematically depicts a molding element according to an embodiment of the invention.

FIG. 1 schematically depicts a molding element 1 according to an embodiment of the invention.

This molding element 1 comprises a molding surface 3 intended to mold part of a tread surface of a tire. The molding element 1 also comprises a complex blade 6, 8 of height H projecting from the molding surface 3. This complex blade comprises a body 6 oriented mainly in a circumferential direction X. The circumferential direction corresponds on the tire to a direction tangential to any circle centred on the axis of rotation of this tire. The complex blade here comprises two U-shaped secondary branches 8 positioned one on each side of the body 6 and facing towards this body. Each secondary branch is oriented mainly in an oblique direction J, this oblique direction making a non-zero angle $\psi$ with a transverse direction Y perpendicular to the circumferential direction X. Each secondary branch 8 is in contact with the body 6 in two contact zones 10, 12 so that the branches 8 delimit closed cavities.

The molding element 1 also comprises a main cutting means 9. This main cutting means projects from the molding surface 3 and its height Hp is greater than the height H of the complex blade 6, 8. This main cutting means 9 extends into the cavity 7 parallel to the oblique direction J. Further, the molding element 1 comprises two secondary cutting means 13 of height Hs greater than the height H of the complex blade 6, 8. These secondary cutting means extend from the main cutting means 9 as far as the body 6. More specifically, the secondary cutting means 13 make with the body 6 an angle $\theta$ less than or equal to 45°.

It will be noted that the main cutting means and the secondary cutting means are intended to cut a layer of a covering material applied beforehand to a green tire. Such cutting means are notably disclosed in document FR11/61760 or document FR11/61762.

Figure 2:
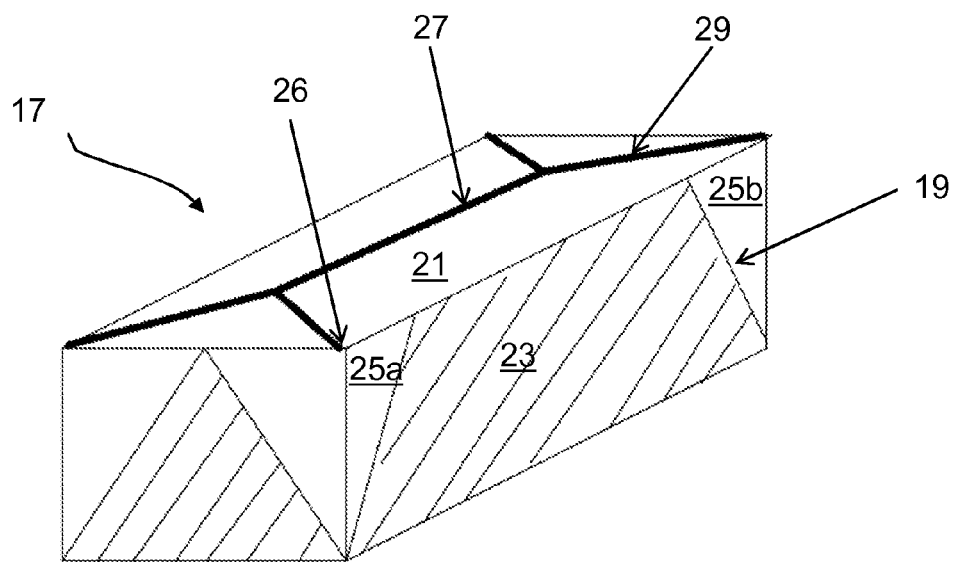
FIG. 2 is a perspective view of a block molded by the molding element of FIG. 1.

FIG. 2 is a perspective view of a block molded by the molding element 1 of FIG. 1.

This block 17 has a height H and a length L. More specifically, the block 17 comprises lateral faces 19 and a contact face 21 connecting these lateral faces 19. Each lateral face 19 is covered with a layer 23 of a covering material over at least 50% of the surface area of the face. The covering material has good rigidity properties, which means to say a strong ability to withstand elastic deformation under compressive and/or shear loadings.

More specifically, the covering material has an elastic modulus higher than the elastic modulus of the rubber material of which the block 3 is made. Such a covering material is, for example, an elastomeric material of which the dynamic shear modulus G*, when subjected to a maximum alternating stress of 0.7 MPa, at a frequency of 10 Hz and a temperature of −10° C., is higher than 200 MPa and preferably higher than 300 MPa. In this document, the terms "elastic modulus G'" and "viscous modulus G''" denote dynamic properties well known to those skilled in the art. These properties are measured on a Metravib VA4000 viscoanalyser on test specimens molded from uncured compositions. Test specimens such as those described in the standard ASTM D 5992-96 (the version published in September 2006, initially approved in 1996), in Figure X2.1 (circular procedure) are used. The diameter of the test specimen is 10 mm (and it therefore has a circular cross section of 78.5 mm$^2$), the thickness of each of the portions of rubber composition is 2 mm, giving a "diameter-to-thickness" ratio of 5 (contrary to standard ISO 2856, mentioned in the ASTM standard at paragraph X2.4, and which recommends a d/L value of 2). The response of a test specimen of vulcanized rubber composition subjected to a simple alternating sinusoidal shear stress at a frequency of 10 Hz is recorded. The test specimen is loaded under sinusoidal stressing at 10 Hz, with the stress (0.7 MPa) applied symmetrically about its equilibrium position. The measurements are taken during an increasing temperature gradient of 1.5° C. per minute, from a temperature Tmin below the glass transition temperature (Tg) of the material, up to a temperature Tmax which may correspond to the rubber plateau of the material. Before commencing the sweep, the test specimen is stabilized at the temperature Tmin for 20 minutes in order to obtain a uniform temperature throughout the test specimen. The result used is the dynamic shear elastic modulus (G') and the viscous shear modulus (G") at the chosen temperatures (in this instance 0°, 5° and 20° C.) The "complex modulus" G* is defined as the absolute value of the complex sum of the elastic modulus G' and viscous modulus G" values: $G^* = \sqrt{(G'^2 + G''^2)}$.

In one alternative form of embodiment, the elastomeric material of the cover layer contains a composition based on at least one diene elastomer with a very high sulphur content, such as ebonite.

In another alternative form of embodiment, the cover layer comprises a collection of fibres, for example a three dimensional collection of fibres forming felt. The fibres in this felt may be selected from the group consisting of textile fibres, mineral fibres and mixtures thereof. It will also be noted that the fibres in this felt may be chosen from textile fibres of natural origin, for example from the group of silk, cotton, bamboo, cellulose, wool fibres and mixtures thereof.

In another alternative form of the embodiment, the elastomeric material of the cover layer contains a composition based on at least one thermoplastic polymer, such as polyethylene terephthalate (PET). Such a polymer may have a Young's modulus higher than 1 GPa.

In FIG. 2 the contact face 21 of the block comprises a leading zone intended to be first to come into contact with the ground when the tire is rolled along. As the block here is inclined with respect to a circumferential direction of the tire, this leading zone forms a leading corner 26. Each lateral face 23 of the block has two zones 25a, 25b that are not covered with the covering material. The non-covered zones here are of triangular overall shape.

The block 1 also comprises a main sipe 27 and secondary sipes 29. The main sipe 27 is molded by the main cutting means 9 and the secondary sipes 29 are molded by the secondary cutting means 13.

As has already been specified, it is the arrangement and shape of the main and secondary cutting means that dictate the shape of the zones covered on the lateral faces with the covering material.

It will be noted that, when the angle θ is identical to the angle ψ, as has been depicted in FIG. 1, the inventors have found that it is easier to apply the layer of covering material to the lateral faces of the block.

Figure 3:
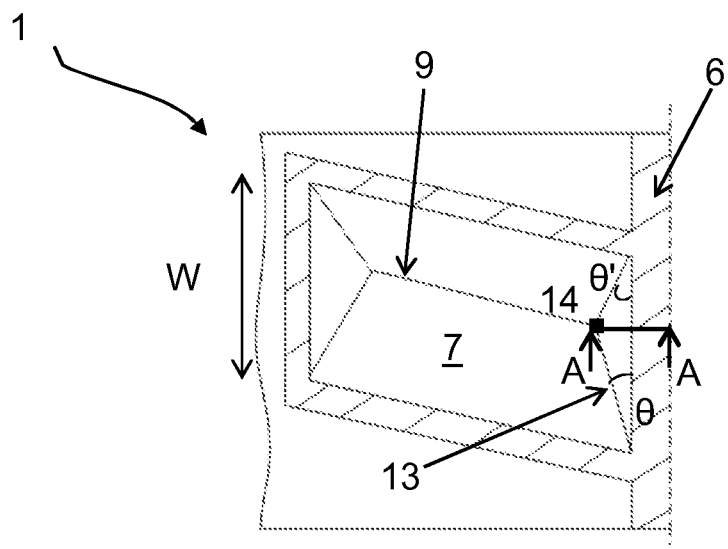
FIG. 3 schematically depicts a part of a molding element according to a second embodiment.

FIG. 3 depicts an alternative form of embodiment of the molding element 1, in which alternative form the main cutting means 9 is arranged in the cavity 7 so that the secondary means 13 respectively make different angles θ, α with the body 6. More particularly, the main cutting means 9 is not, in this instance, centred with respect to the width W of the cavity 7 as it was in the example of FIG. 1.

Figure 4:
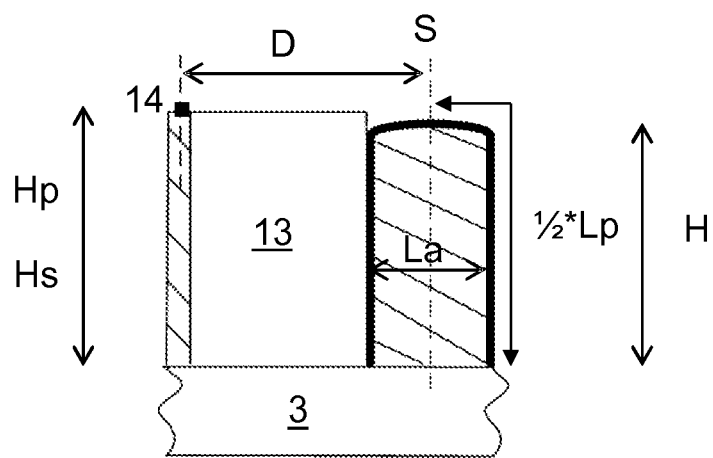
FIG. 4 depicts the molding element of FIG. 3 in partial section on A-A.

FIG. 4 is a depiction of the molding element 1 in part section on A-A of FIG. 3.

In this sectional view, the body 6 of the complex blade has a profile of length Lp and a width La. This profile exhibits symmetry about an axis of symmetry S perpendicular to the molding surface 3. The angle α and the angle θ of FIG. 3 have values such that:

$$\tan(\theta) \leq \frac{\cos(\psi)}{\left(\frac{W}{(Lp - La)} - \sin(\psi)\right)}$$

and $$\tan(\alpha) \leq \frac{\cos(\psi)}{\left(\frac{W}{(Lp - La)} + \sin(\psi)\right)}$$

The invention is not restricted to the examples described and depicted and various modifications can be made thereto without departing from its scope.

The invention claimed is:

1. A molding element of a mold for molding and vulcanizing a tire tread, this molding element comprising:
   a molding surface adapted to mold part of the tread surface of the tire, and
   a complex blade of height H projecting from the molding surface, this complex blade comprising:
      a body oriented mainly in a circumferential direction X, and
      at least one U-shaped secondary branch facing towards this body, this secondary branch being oriented mainly in an oblique direction J, this oblique direction making a non-zero angle ψ with a transverse direction Y perpendicular to the circumferential direction X,
      wherein the secondary branch is in contact with the body at two contact zones to delimit a cavity of length L,
   a main cutting means of height Hp projecting from the molding surface in the cavity, and extending between two ends and running parallel to the oblique direction J, wherein a length of this main cutting means, measured between its two ends, being less than the length L of the cavity, and
   at least two secondary cutting means of height Hs extending from one of the ends of the main cutting means as far as a respective one of the contact zones facing this end, each secondary cutting means forming an angle θ with the body,
   wherein the height Hp of the main cutting means and the height Hs of the secondary cutting means are greater than the height H of the complex blade.

2. The molding element according to claim 1, wherein the angle θ is identical to the angle ψ.

3. The molding element according to claim 1, wherein the main cutting means is positioned in the cavity in such a way that the secondary cutting means respectively form different angles (θ,α) with the body of the complex blade.

* * * * *